(12) United States Patent
Zhou et al.

(10) Patent No.: US 12,307,682 B2
(45) Date of Patent: May 20, 2025

(54) VIRTUAL SELFIE STICK

(71) Applicant: Snap Inc., Santa Monica, CA (US)

(72) Inventors: Kai Zhou, Wiener Neudorf (AT); Branislav Micusik, St.Andrae-Woerdern (AT)

(73) Assignee: Snap Inc., Santa Monica, CA (US)

(*) Notice: Subject to any disclaimer, the term of this patent is extended or adjusted under 35 U.S.C. 154(b) by 129 days.

(21) Appl. No.: 17/851,448

(22) Filed: Jun. 28, 2022

(65) Prior Publication Data
US 2023/0421717 A1 Dec. 28, 2023

(51) Int. Cl.
| G06T 7/194 | (2017.01) |
| G06T 3/4007 | (2024.01) |
| G06T 7/11 | (2017.01) |
| G06T 7/50 | (2017.01) |
| G06T 7/70 | (2017.01) |
| H04N 5/265 | (2006.01) |
| H04N 23/60 | (2023.01) |
| H04N 23/63 | (2023.01) |

(52) U.S. Cl.
CPC ............ *G06T 7/194* (2017.01); *G06T 3/4007* (2013.01); *G06T 7/11* (2017.01); *G06T 7/50* (2017.01); *G06T 7/70* (2017.01); *H04N 5/265* (2013.01); *H04N 23/632* (2023.01); *H04N 23/64* (2023.01); *G06T 2200/24* (2013.01); *G06T 2207/30201* (2013.01); *G06T 2207/30244* (2013.01)

(58) Field of Classification Search
None
See application file for complete search history.

(56) References Cited

U.S. PATENT DOCUMENTS

| 2011/0229024 A1* | 9/2011 | El-Maraghi | G06T 7/12 |
| | | | 382/162 |
| 2014/0354781 A1* | 12/2014 | Matsuyama | H04N 25/134 |
| | | | 348/49 |
| 2016/0110848 A1 | 4/2016 | Gray et al. | |
| 2019/0197333 A1* | 6/2019 | Patankar | H04N 23/69 |
| 2021/0344927 A1* | 11/2021 | Abbas | H04N 13/111 |
| 2022/0358619 A1* | 11/2022 | Chen | G06T 3/0012 |

OTHER PUBLICATIONS

Zhang, Yun, Yu-Kun Lai, and Fang-Lue Zhang. "Content-preserving image stitching with regular boundary constraints." arXiv preprint arXiv:1810.11220 (2018). (Year: 2018).*
"International Application Serial No. PCT US2023 069064, International Search Report mailed Sep. 25, 2023", 3 pgs.
"International Application Serial No. PCT US2023 069064, Written Opinion mailed Sep. 25, 2023", 5 pgs.

* cited by examiner

*Primary Examiner* — Sarah Le
(74) *Attorney, Agent, or Firm* — Schwegman Lundberg & Woessner, P.A.

(57) ABSTRACT

A method for generating a virtual selfie stick image is described. In one aspect, the method includes generating, at a device, an original self-portrait image with an optical sensor of the device, the optical sensor directed at a face of a user of the device, the device being held at an arm length from the face of the user, displaying, on a display of the device, an instruction guiding the user to move the device at the arm length about the face of the user within a limited range at a plurality of poses, accessing, at the device, image data generated by the optical sensor at the plurality of poses, and generating a virtual selfie stick self-portrait image based on the original self-portrait image and the image data.

18 Claims, 16 Drawing Sheets

VIRTUAL SELFIE STICK

TECHNICAL FIELD

The subject matter disclosed herein generally relates to an imaging system. Specifically, the present disclosure addresses systems and methods for generating a self-portrait image.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system (also referred to as visual tracking system) uses images captured by an optical sensor of the AR/VR device to track its pose. However, the images can be blurry when the AR/VR device moves fast. As such, high motion blur results in degraded tracking performance. Alternatively, high motion blur results in higher computational operations to maintain adequate tracking accuracy and image quality under high dynamics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
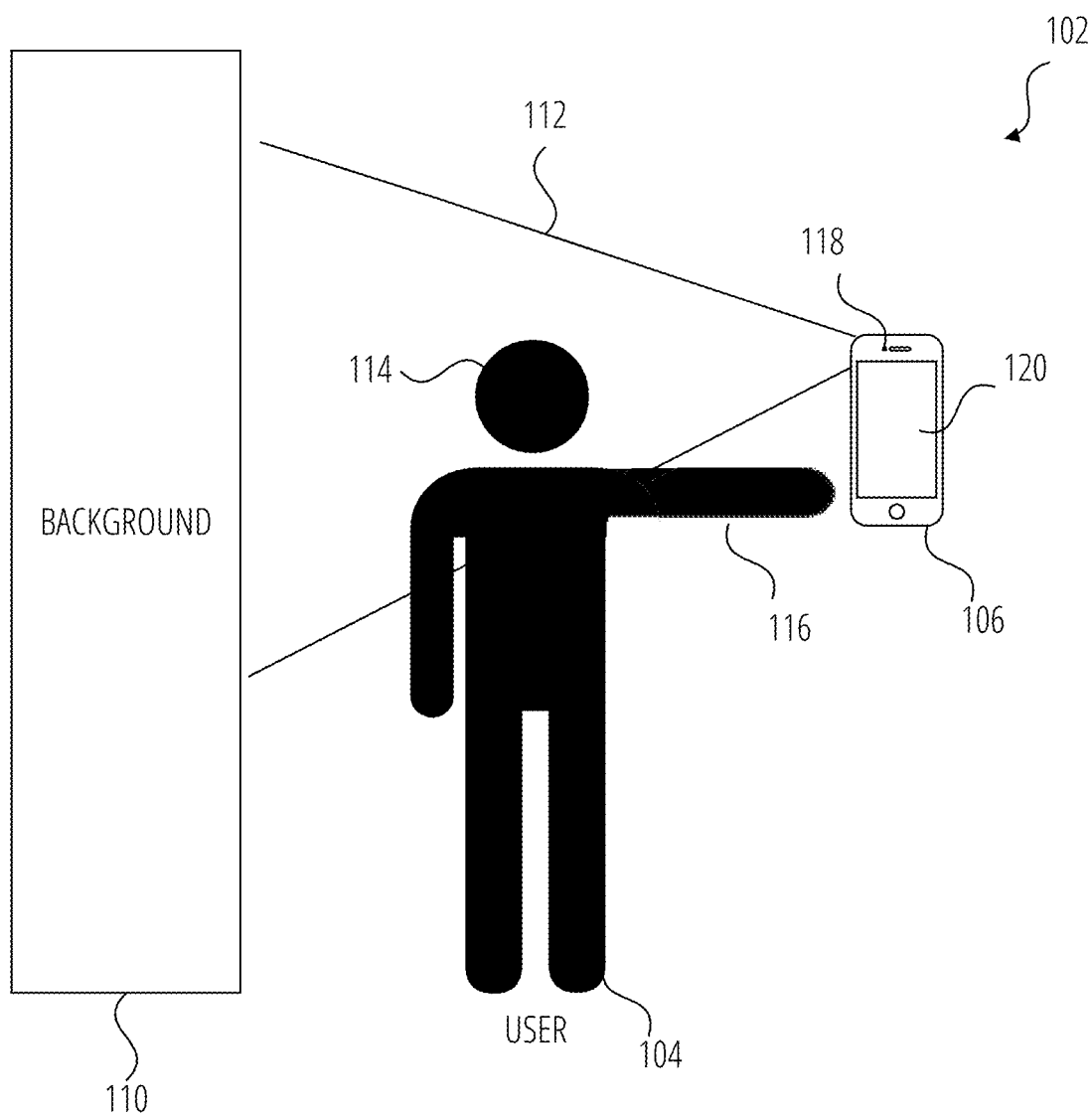
FIG. 1 illustrates an example environment for operating a device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "selfie" is used herein to refer to a photograph (e.g., a "self-portrait image") that one has taken of oneself. For example, the self-portrait image is taken captured using a camera/smartphone that is held by the user with his/her arm extended. The term "selfie stick" refers to a rod/stick on which the camera may be mounted, enabling the person holding the stick to take a photograph of themselves from a greater distance than if holding the camera or smartphone in their hand.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

When taking a selfie, the image of a face of a user may be appear distorted due to the proximity of the camera to the face of the user. On the other hand, selfies or portraits taken with a selfie stick have less distortion than selfies taken at arm's length. Without a selfie stick, the ideal distance to take a portrait image may be difficult.

The present application describes a method for optimizing image processing by separating areas on the portrait image into invisible areas, blocked areas, and interpolation areas, and applying a computer vision algorithm only specific portions of the portrait image, instead of calculating every pixels of the portrait image. For example, only the pixels in the invisible areas and blocked areas are calculated using computer vision algorithm such as MutliView Stereo (MVS) technique or Neural Radiance Fields (NeRF) technique. The other areas in the portrait image are calculated using image interpolation (e.g., scaling), which is significantly faster and more efficient than any 3D computer vision algorithm.

As such, the present application describes provides an efficient process to generate portrait image (e.g., distance from camera to face ~1.5 m) by leveraging one's selfie image (distance from camera to face ~0.5 m) and several images taken around the face at similar distance (~0.5 m). The portrait image is produced using computer vision algorithm which separates the pixels into 3 different types (missing, blocked and interpolatable). The first 2 types of pixels can be calculated using standard 3D synthesis view generation methods such as Multiple View Stereo (MVS) or neural radiance fields (NeRF) or different variants such as MVSNeRF. The interpolatable pixels can be calculated using the interpolation of pixels on selfie image. The interpolation process is a much faster process (than 3D computer vision algorithms).

A method for generating a virtual selfie stick image is presently described. In one aspect, the method includes generating, at a device, an original self-portrait image with an optical sensor of the device, the optical sensor directed at a face of a user of the device, the device being held at an arm length from the face of the user, displaying, on a display of the device, an instruction guiding the user to move the device at the arm length about the face of the user within a limited range at a plurality of poses, accessing, at the device, image data generated by the optical sensor at the plurality of poses, and generating a virtual selfie stick self-portrait image based on the original self-portrait image and the image data.

As a result, one or more of the methodologies described herein facilitate solving the technical problem of processing distortions and rendering a self-portrait image. The presently described a method provides an improvement to an operation of the functioning of a device by limiting computational operations of computer vision algorithm to specific regions in an image. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 illustrates an example environment 102 for operating a device 106 in accordance with one example embodiment. The environment 102 includes a user 104, the device 106, and a background 110. The user 104 operates the device 106.

The device 106 may be a computing device with a display such as a smartphone or a tablet computer. The device 106 can include a front facing camera 118 and a rear facing camera (not shown). The user 104 holds the device 106 (using extended user arm 116) with the front facing camera 118 directed at the user head 114 to capture a selfie image. The front facing camera 118 has a field of view 112 that captures an image of a face of the user 104 and the background 110. The background 110 includes any scenery located behind the user 104. The device 106 includes a screen 120 that displays the selfie image that is captured with the front facing camera 118 of the device 106.

In one example embodiment, the device 106 includes a pose tracking system 210. The pose tracking system 210 tracks the pose (e.g., position and orientation) of the device 106 relative to the environment 102 using, for example, optical sensors (e.g., depth-enabled 3D camera, image camera), inertial sensors (e.g., gyroscope, accelerometer), wireless sensors (Bluetooth, Wi-Fi), GPS sensor, and audio sensor. In one example, the device 106 displays virtual content based on the pose of the device 106 relative to the user head 114 and/or the background 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10 to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, the device 106 may be combined into a single machine, and the functions described herein for any single machine, database, or device may be subdivided among multiple machines, databases, or devices.

The device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
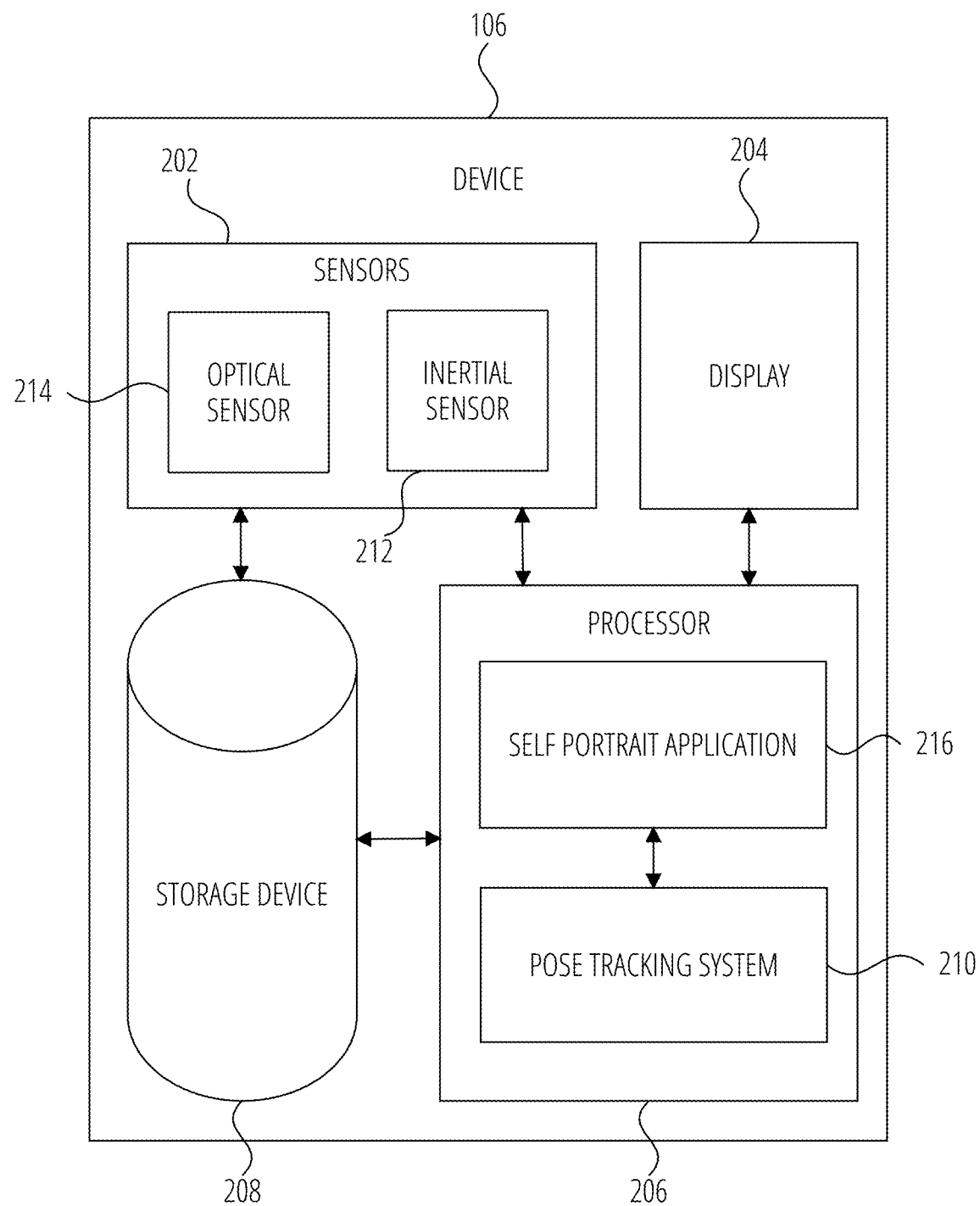
FIG. 2 is a block diagram illustrating a device in accordance with one example embodiment.

FIG. 2 is a block diagram illustrating modules (e.g., components) of the device 106, according to some example embodiments. The device 106 includes sensors 202, a display 204, a processor 206, and a storage device 208. Examples of device 106 include a mobile computing device or a smart phone.

The sensors 202 include, for example, an optical sensor 214 (e.g., camera such as a color camera, a thermal camera, a depth sensor and one or multiple grayscale, global/rolling shutter tracking cameras) and an inertial sensor 212 (e.g., gyroscope, accelerometer, magnetometer). Other examples of sensors 202 include a proximity or location sensor (e.g., near field communication, GPS, Bluetooth, Wifi), an audio sensor (e.g., a microphone), a thermal sensor, a pressure sensor (e.g., barometer), or any suitable combination thereof. It is noted that the sensors 202 described herein are for illustration purposes and the sensors 202 are thus not limited to the ones described above.

The display 204 includes a screen or monitor configured to display images generated by the processor 206. In another example, the display 204 includes a touchscreen display configured to receive a user input via a contact on the touchscreen display.

The processor 206 includes a self-portrait application 216 and a pose tracking system 210. The self-portrait application 216 generates a virtual selfie stick self-portrait image using a combination of computer vision algorithm and scaling algorithm. In one example embodiment, the self-portrait application 216 accesses a selfie image and a plurality of other selfie images taken from different angles, and generates a virtual selfie stick self-portrait image based on the selfie image and the plurality of other selfie images taken from different angles. The self-portrait application 216 partitions or separates the virtual selfie stick self-portrait image into three different types (missing, blocked and interpolatable). The self-portrait application 216 applies the computer vision algorithm (e.g., 3D synthesis view generation methods such as Multiple View Stereo (MVS) or neural radiance fields (NeRF) or different variants such as MVSNeRF) to calculate pixels in the missing and blocked areas. The self-portrait application 216 calculates the interpolatable pixels in the interpolation areas using the interpolation of pixels on the selfie image.

The pose tracking system 210 estimates a pose of the device 106. For example, the pose tracking system 210 uses image data and corresponding inertial data from the optical sensor 214 and the inertial sensor 212 to track a location and pose of the device 106 relative to a frame of reference (e.g., real-world environment). The pose tracking system 210 is described in more detail below with respect to FIG. 8.

The storage device 208 stores the selfie image, the plurality of other selfie images taken from different angles, the pose of the device 106 corresponding to the different angles, and the virtual selfie stick self-portrait image.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
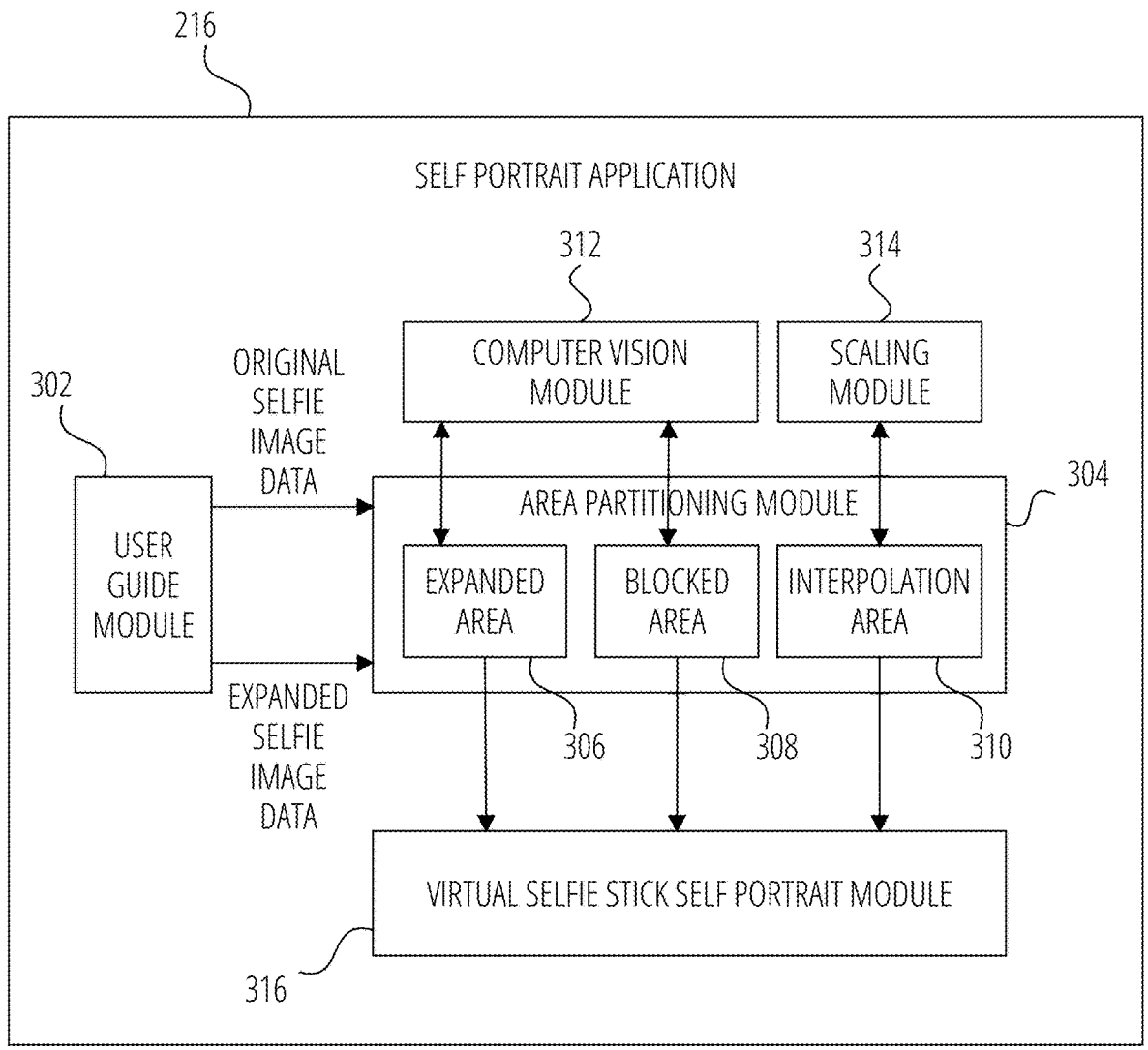
FIG. 3 is a block diagram illustrating a self-portrait application in accordance with one example embodiment.

FIG. 3 is a block diagram illustrating the self-portrait application 216 in accordance with one example embodiment. The self-portrait application 216 includes a user guide module 302, an area partitioning module 304, an expanded area 306, a blocked area 308, an interpolation area 310, a computer vision module 312, a scaling module 314, and a virtual selfie stick self-portrait module 316.

The user guide module 302 generates instructions to the user 104 to take an original selfie image and then to move the device 106 in different directions to captures other selfies at those different angles. In one example, the user guide module 302 generates a graphical user interface that displays a direction indicator or provides written instructions for the user to move his device 106 in a prescribed direction. The user guide module 302 accesses the image captured by the optical sensor 214 (e.g., front facing camera 118) at the original selfie location and at the other angles. The user guide module 302 provides the original selfie image data from the original selfie image to the area partitioning module 304. The user guide module 302 provides an expanded selfie image data from the selfie images captured at other angles to the area partitioning module 304. For example, the expanded selfie image data two or more images captured from two or more different angles.

Figure 4:
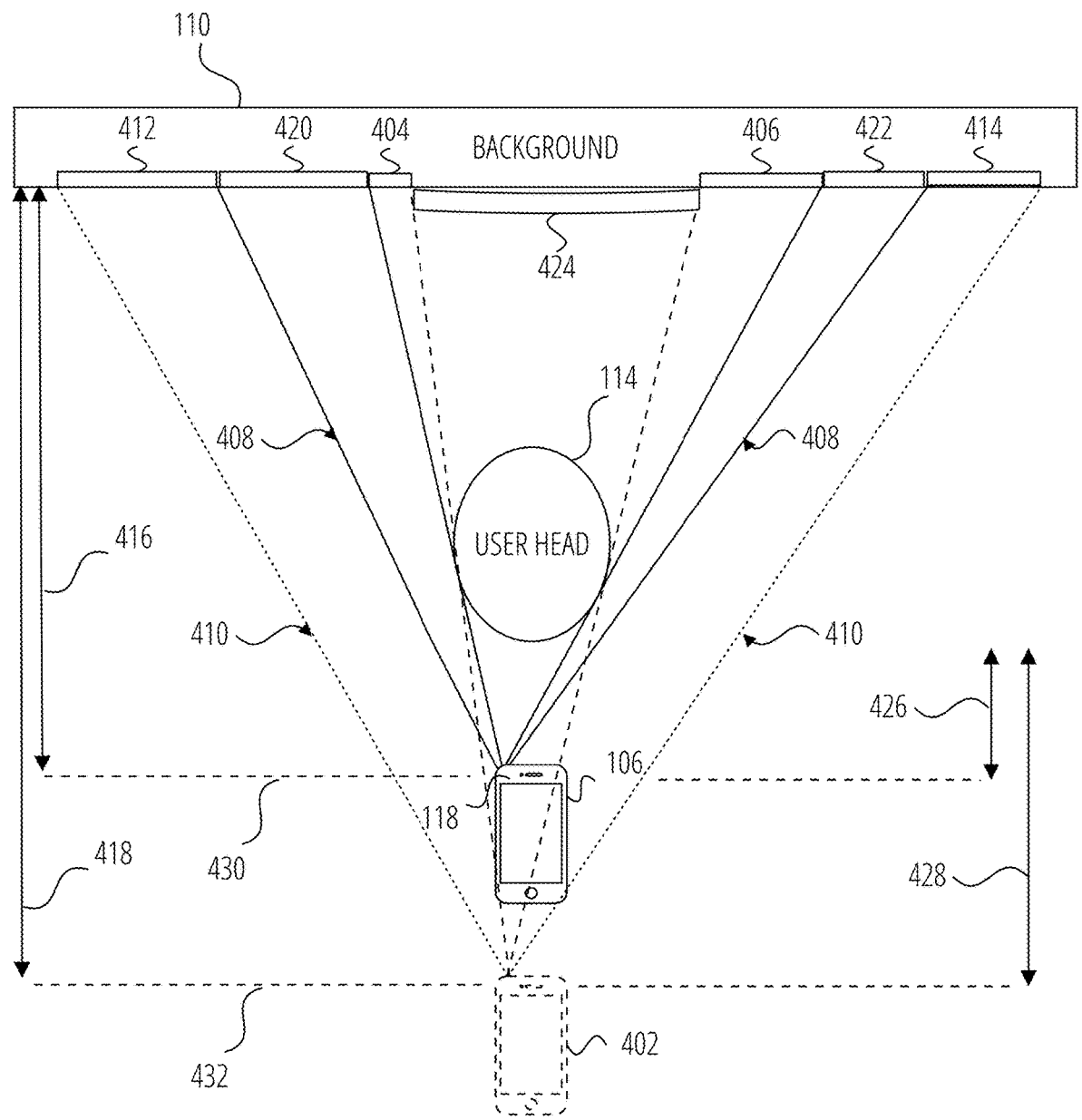
FIG. 4 is a block diagram illustrating image areas of a virtual selfie stick self-portrait image in accordance with one example embodiment.
Figure 14:
FIG. 14 illustrates regions of a virtual selfie stick self-portrait image in accordance with one example embodiment.

The area partitioning module 304 identifies portions of the virtual selfie stick self-portrait image: an expanded area 306, a blocked area 308, and an interpolation area 310. The expanded area 306 includes a border region of the virtual selfie stick self-portrait image. For example, the border region includes content that contiguously expand from a perimeter region of the original self-portrait image. Examples of the expanded area 306 are illustrated in FIG. 4 and FIG. 14. The blocked area 308 includes a blocked region that is adjacent to the face of the user 104 in the virtual selfie stick self-portrait image. The blocked region includes background content (e.g., portions of the background 110) that is blocked by the user head 114 in the original self-portrait image. Examples of the blocked area 308 are illustrated in FIG. 4 and FIG. 14. The interpolation area 310 includes a remapping region that includes the face of the user 104 and content from background 110 displayed in both the original self-portrait image and the virtual selfie stick self-portrait image. The remapping region excludes the border region and the blocked region. Examples of the interpolation area 310 are illustrated in FIG. 4 and FIG. 14.

The computer vision module 312 includes a computer vision algorithm (e.g., 3D synthesis view generation methods such as Multiple View Stereo (MVS) or neural radiance fields (NeRF) or different variants such as MVSNeRF) to calculate pixels in the expanded area 306 and the blocked area 308. The scaling module 314 includes a scaling/mapping engine that calculates the interpolatable pixels in the interpolation area 310 using the interpolation of pixels on the selfie image.

The virtual selfie stick self-portrait module 316 forms the virtual selfie stick self-portrait image based on a combination of the processed expanded area 306, blocked area 308, and interpolation area 310.

FIG. 4 is a block diagram illustrating image areas of a virtual selfie stick self-portrait image in accordance with one example embodiment. The user 104 holds the device 106 with his arm extended to take an original selfie image. The front facing camera 118 includes an original field of view 408 that captures an image of a face of the user 104 (e.g., face area 424) and the background 110. The user head 114 blocks the blocked area 404 and blocked area 406 of the background 110. The device 106 is located along an original plane 430 located with an original foreground depth 426 and an original background depth 416.

The virtual selfie stick self-portrait module 316 generates the virtual selfie stick self-portrait image to make it appear as if it was taken at selfie stick location 402. The selfie stick location 402 would place the device 106 along a virtual plane 432 with a virtual selfie stick foreground depth 428 and a selfie stick background depth 418. The device 106 located at selfie stick location 402 would have a selfie stick field of view 410 that captures an image of a face of the user 104 (e.g., face area 424) and the background 110. Because the selfie stick location 402 is further away from the user head 114, a larger portion of the background 110 is captured: expanded area 412 and expanded area 414.

The computer vision module 312 performs computation on the expanded area 412, expanded area 414, blocked area 404, and blocked area 406. The scaling module 314 remaps or rescales the interpolation area 420, interpolation area 422, and the face area 424 to match a scaling of the virtual selfie stick self-portrait image relative to the original selfie image.

Figure 5:
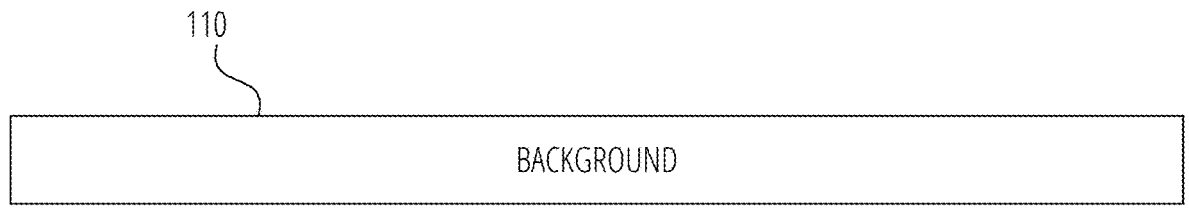
FIG. 5 illustrates an example operation of the device in accordance with one example embodiment.
Figure 5:
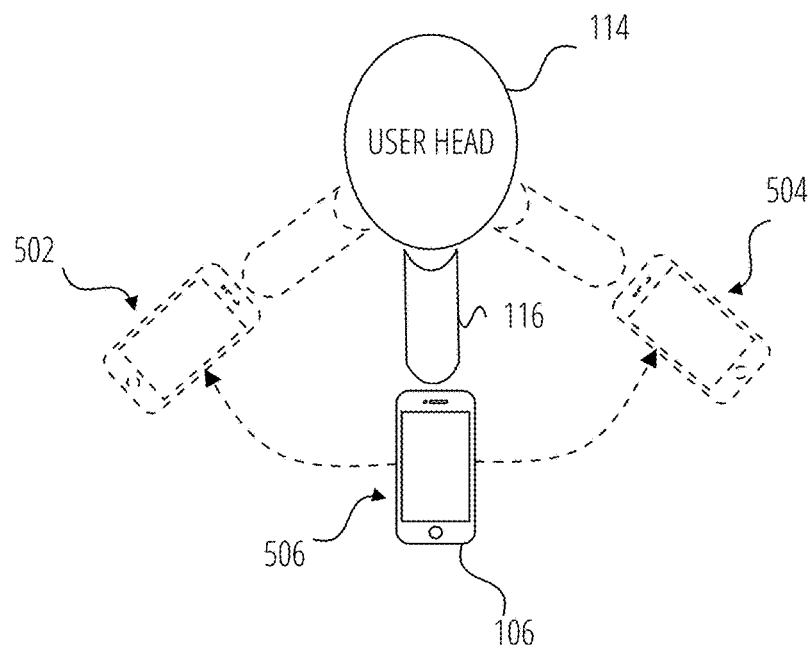

FIG. 5 illustrates an example operation of the device 106 in accordance with one example embodiment. The user 104 holds the device 106 with extended user arm 116 to capture an original selfie image at pose A 506. The device 106 captures a first image (e.g., the original selfie image) at pose A 506 and registers the first image with pose A 506.

The device 106 instructs the user to move the device 106 with his/her extended user arm 116 to different angles/poses (e.g., pose B 502, and pose C 504). The device 106 captures a second image at pose B 502 and registers the second image with pose B 502. The device 106 captures a third image at pose C 504 and registers the third image with pose C 504.

Figure 6:
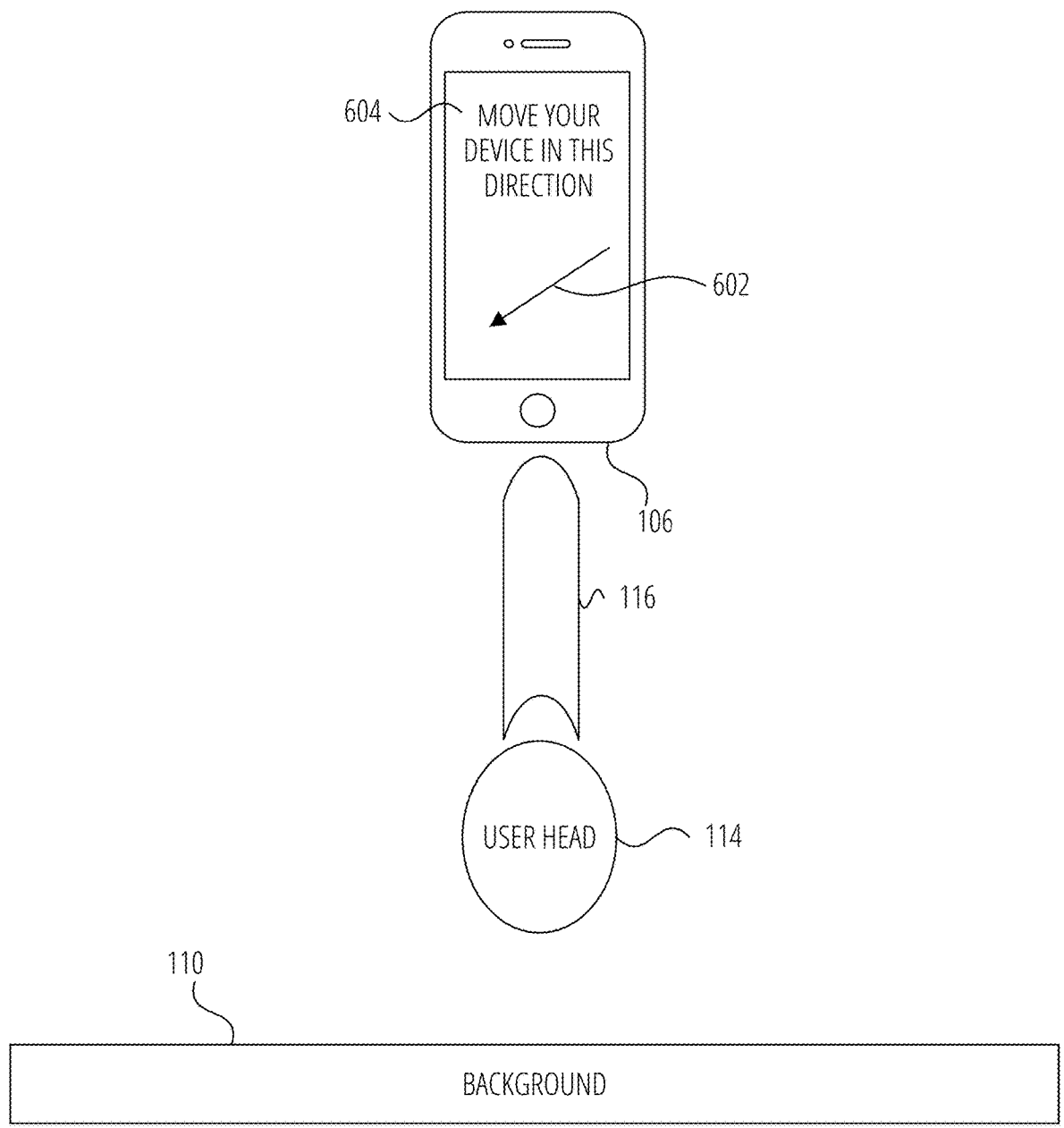
FIG. 6 illustrates an example graphical user interface of the self-portrait application in accordance with one example embodiment.

FIG. 6 illustrates an example graphical user interface of the self-portrait application in accordance with one example embodiment. The user 104 holds the device 106 with extended user arm 116 to capture an original selfie image against a background 110. The device 106 includes a graphical user interface that displays instructions 604 and/or a direction indicator 602 to instruct or guide the user 104 to move the device 106 in a specific direction.

Figure 7:
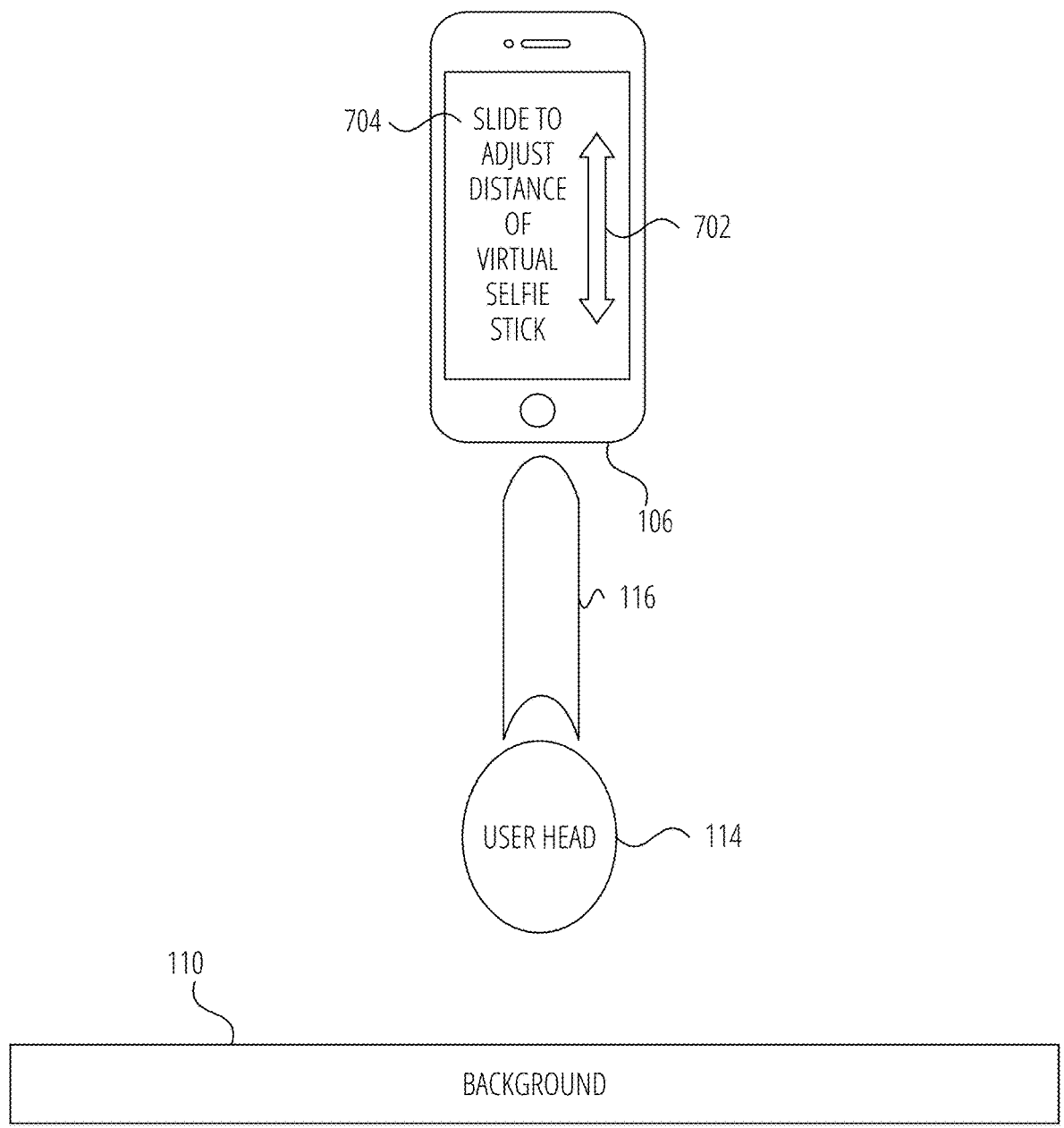
FIG. 7 illustrates an example graphical user interface of the self-portrait application in accordance with one example embodiment.

FIG. 7 illustrates an example graphical user interface of the self-portrait application in accordance with one example embodiment. The user 104 holds the device 106 with extended user arm 116 to capture an original selfie image against a background 110. The device 106 includes a graphical user interface that displays instructions 704 and a slider 702 to enable the user 104 to adjust a distance of the virtual selfie stick relative to the user 104 (e.g., virtual selfie stick foreground depth 428). Once the new foreground depth is set, the computer vision module 312 performs computation on the expanded area 412, expanded area 414, blocked area 404, and blocked area 406 based on the new foreground depth. The scaling module 314 remaps or rescales the interpolation area 420, interpolation area 422, and the face area 424 to match a scaling of the virtual selfie stick self-portrait image relative to the original selfie image based on the new foreground depth.

Figure 8:
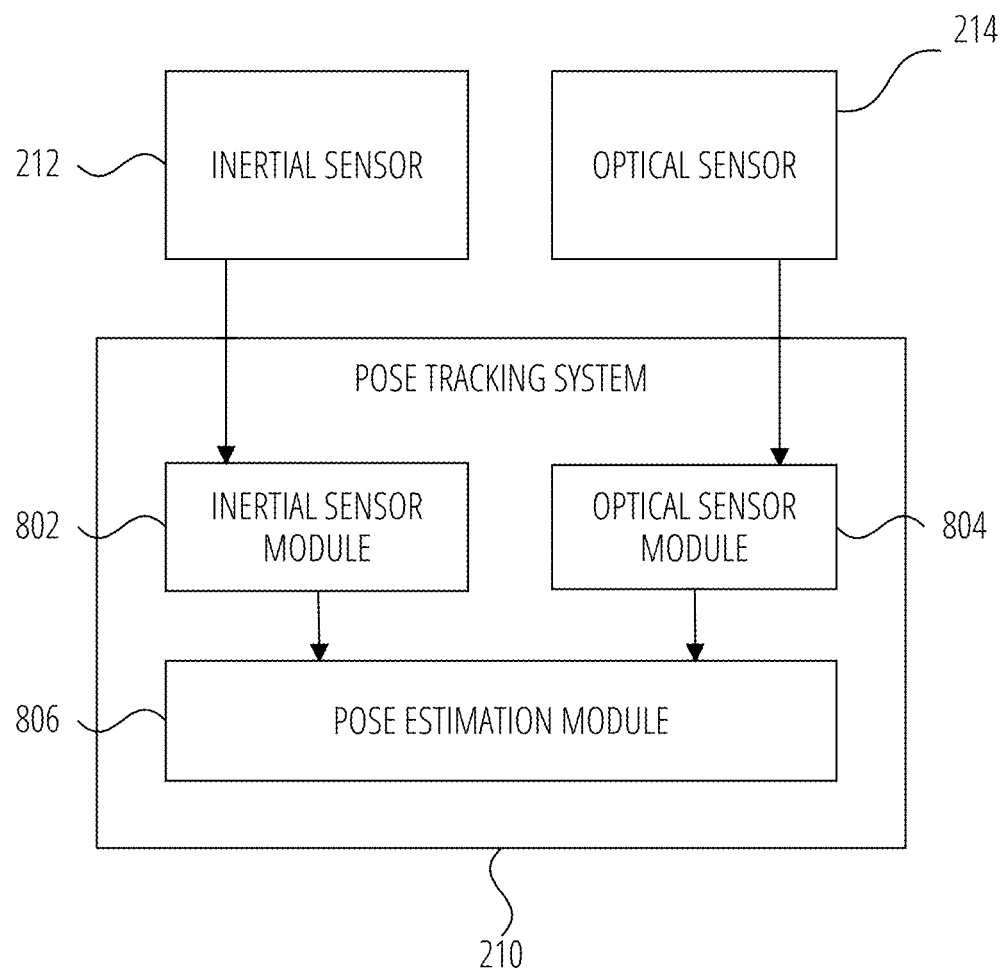
FIG. 8 is a block diagram illustrating a visual tracking system in accordance with one example embodiment.

FIG. 8 is a block diagram illustrating a pose tracking system 210 in accordance with one example embodiment. The pose tracking system 210 includes an inertial sensor module 802, an optical sensor module 804, and a pose estimation module 806. The inertial sensor module 802 accesses inertial sensor data from the inertial sensor 212. The optical sensor module 804 accesses optical sensor data (e.g., image, camera settings/operating parameters) from the optical sensor 214. Examples of camera operating parameters include, but are not limited to, exposure time of the optical sensor 214, a field of view of the optical sensor 214, an ISO value of the optical sensor 214, and an image resolution of the optical sensor 214.

The pose estimation module 806 determines a pose (e.g., location, position, orientation) of the device 106 relative to a frame of reference (e.g., user head 114 or background 110). In one example embodiment, the pose estimation module 806 includes a VIO system that estimates the pose of the device 106 based on 3D maps of feature points from current images captured with the optical sensor 214 and the inertial sensor data captured with the inertial sensor 212.

In one example embodiment, the pose estimation module 806 computes the position and orientation of the device 106. The device 106 includes one or more optical sensor 214 mounted on a rigid platform (a frame of the device 106) with one or more inertial sensor 212. The optical sensor 214 can be mounted with non-overlapping (distributed aperture) or overlapping (stereo or more) fields-of-view.

In some example embodiments, the pose estimation module 806 includes an algorithm that combines inertial information from the inertial sensor 212 and image information from the pose estimation module 806 that are coupled to a rigid platform (e.g., device 106) or a rig. In one embodiment, a rig may consist of multiple cameras mounted on a rigid platform with an inertial navigation unit (e.g., inertial sensor 212). A rig may thus have at least one inertial navigation unit and at least one camera.

Figure 9:
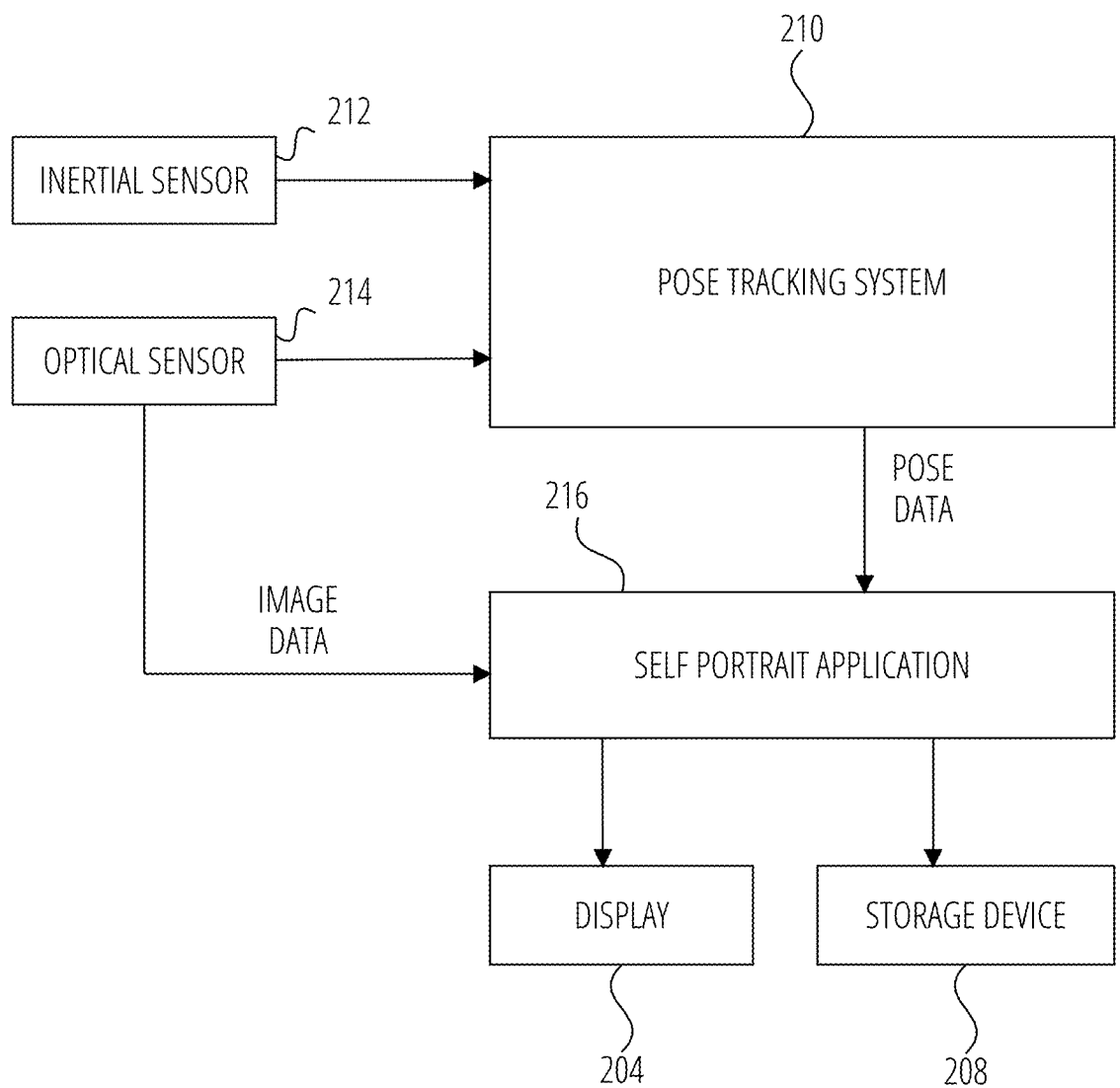
FIG. 9 is a block diagram illustrating an example process of the self-portrait application in accordance with one example embodiment.

FIG. 9 is a block diagram illustrating an example process in accordance with one example embodiment. The pose tracking system 210 receives sensor data from sensors 202 to determine a pose of the device 106. The pose estimation module 806 identifies a pose of the pose tracking system 210 and provides the pose data to the self-portrait application 216.

The self-portrait application 216 retrieves image data from the optical sensor 214 and applies a combination of computer vision and scaling algorithm to different parts of the image to generate a virtual selfie stick self-portrait image. The virtual selfie stick self-portrait image is displayed in display 204 and can be stored in storage device 208.

Figure 10:
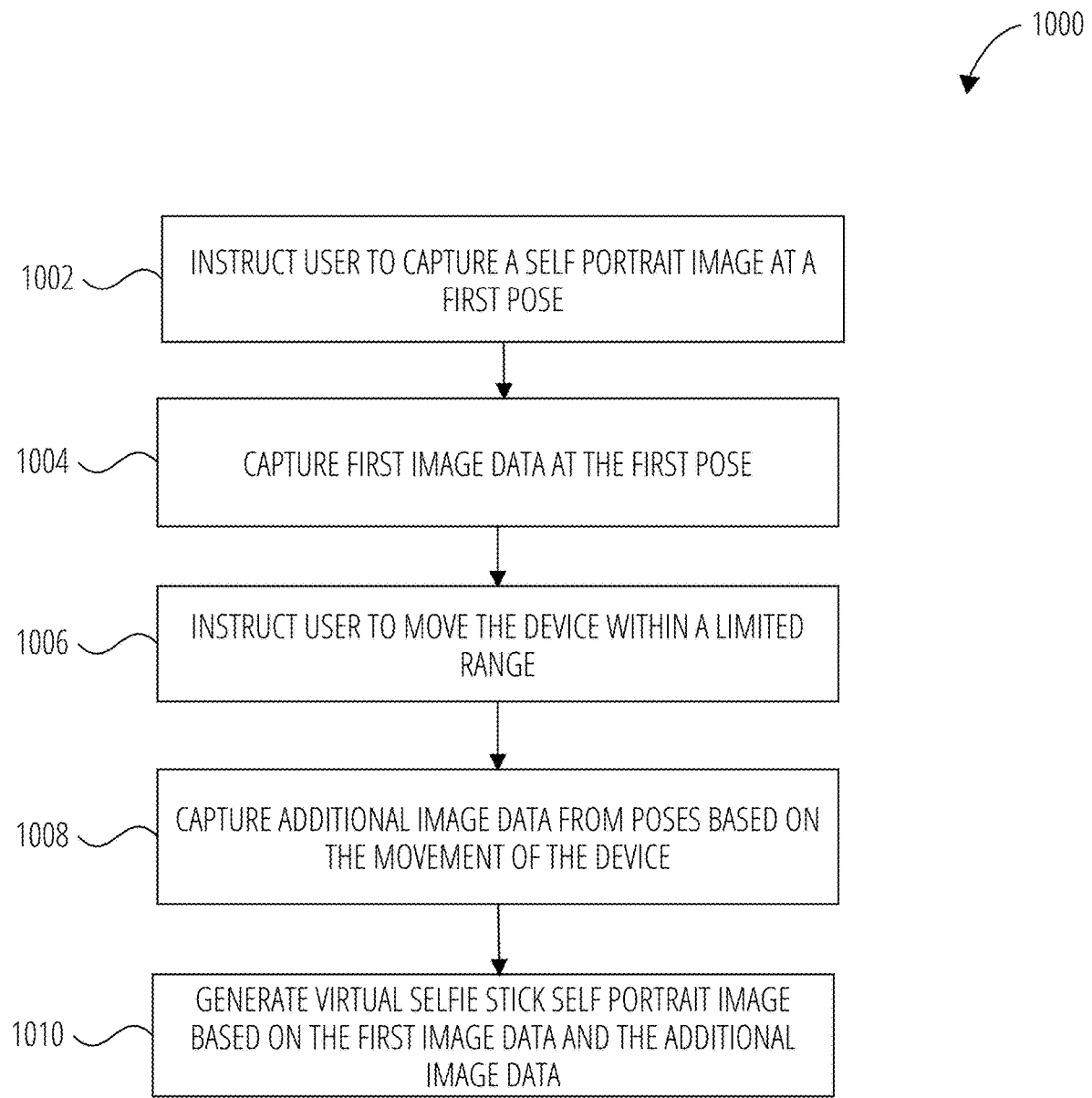
FIG. 10 is a flow diagram illustrating a method for generating a virtual selfie stick self-portrait image in accordance with one example embodiment.

FIG. 10 is a flow diagram illustrating a method 1000 for applying computer vision algorithm to generate a virtual selfie stick self-portrait image in accordance with one example embodiment. Operations in the method 1000 may be performed by the self-portrait application 216, using components (e.g., modules, engines) described above with respect to FIG. 3. Accordingly, the method 1000 is described by way of example with reference to the self-portrait application 216. However, it shall be appreciated that at least some of the operations of the method 1000 may be deployed on various other hardware configurations or be performed by similar components residing elsewhere.

In block 1002, the user guide module 302 instructs the user 104 to capture a self-portrait image (e.g., original selfie image) at a first pose. In block 1004, the user guide module 302 captures first image data at the first pose. In block 1006, the user guide module 302 instructs the user 104 to move the device 106 within a limited range. In block 1008, the user guide module 302 captures additional image data from poses based on the movement of the device 106. In block 1010, the virtual selfie stick self-portrait module 316 generates a virtual selfie stick self-portrait image based on the first image data and the additional image data.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 11:
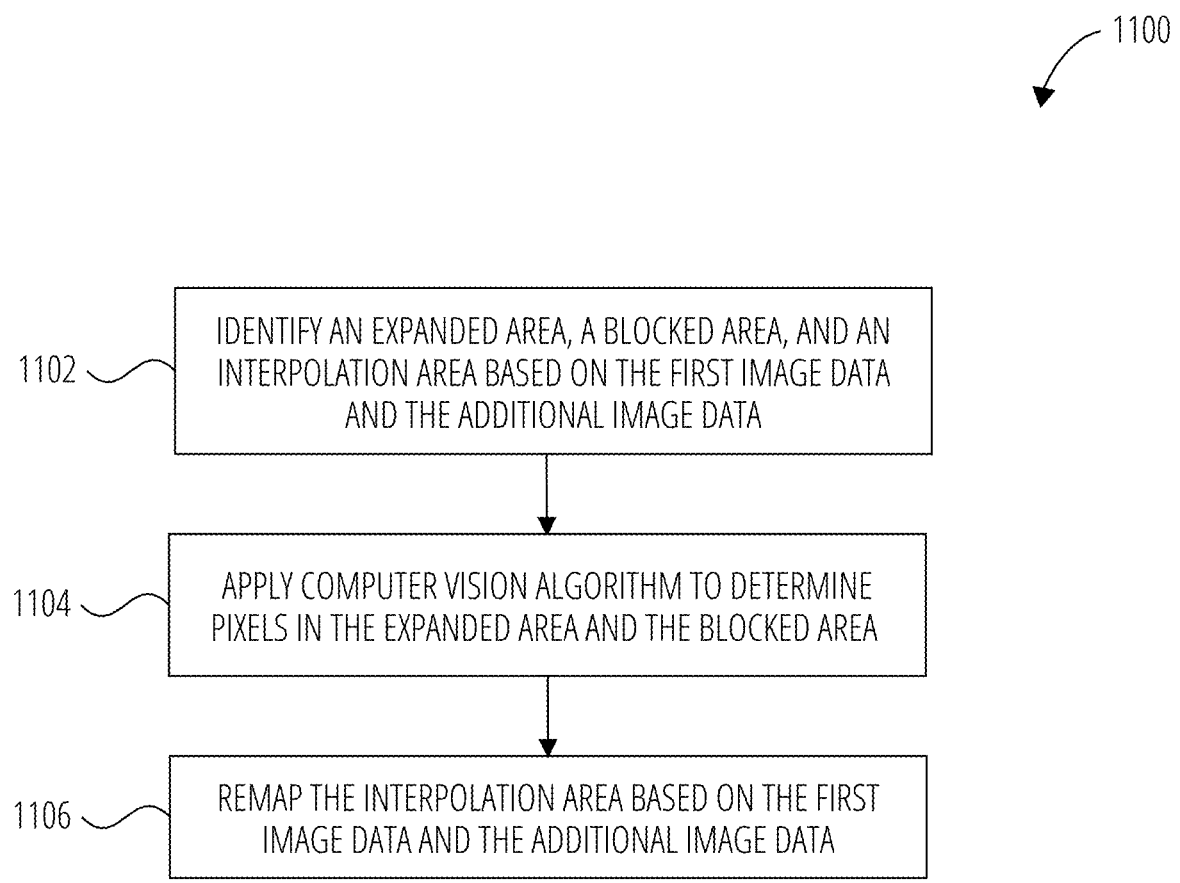
FIG. 11 is a flow diagram illustrating a method for applying computer vision algorithm to generate a virtual selfie stick self-portrait image in accordance with one example embodiment.

FIG. 11 is a flow diagram illustrating a method for applying computer vision algorithm to generate a virtual selfie stick self-portrait image in accordance with one example embodiment. Operations in the method 1100 may be performed by the self-portrait application 216, using components (e.g., modules, engines) described above with respect to FIG. 3. Accordingly, the method 1100 is described by way of example with reference to the self-portrait application 216. However, it shall be appreciated that at least some of the operations of the method 1100 may be deployed on various other hardware configurations or be performed by similar components residing elsewhere.

In block 1102, the area partitioning module 304 identifies an expanded area 306, a blocked area 308, and an interpolation area 310 based on the first image data and the additional image data. In block 1104, the computer vision module 312 applies computer vision algorithm to determine pixels in the expanded area 306 and the blocked area 308. In block 1106, the scaling module 314 remaps the interpolation area 310 based on the first image data and the additional image data.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 12:
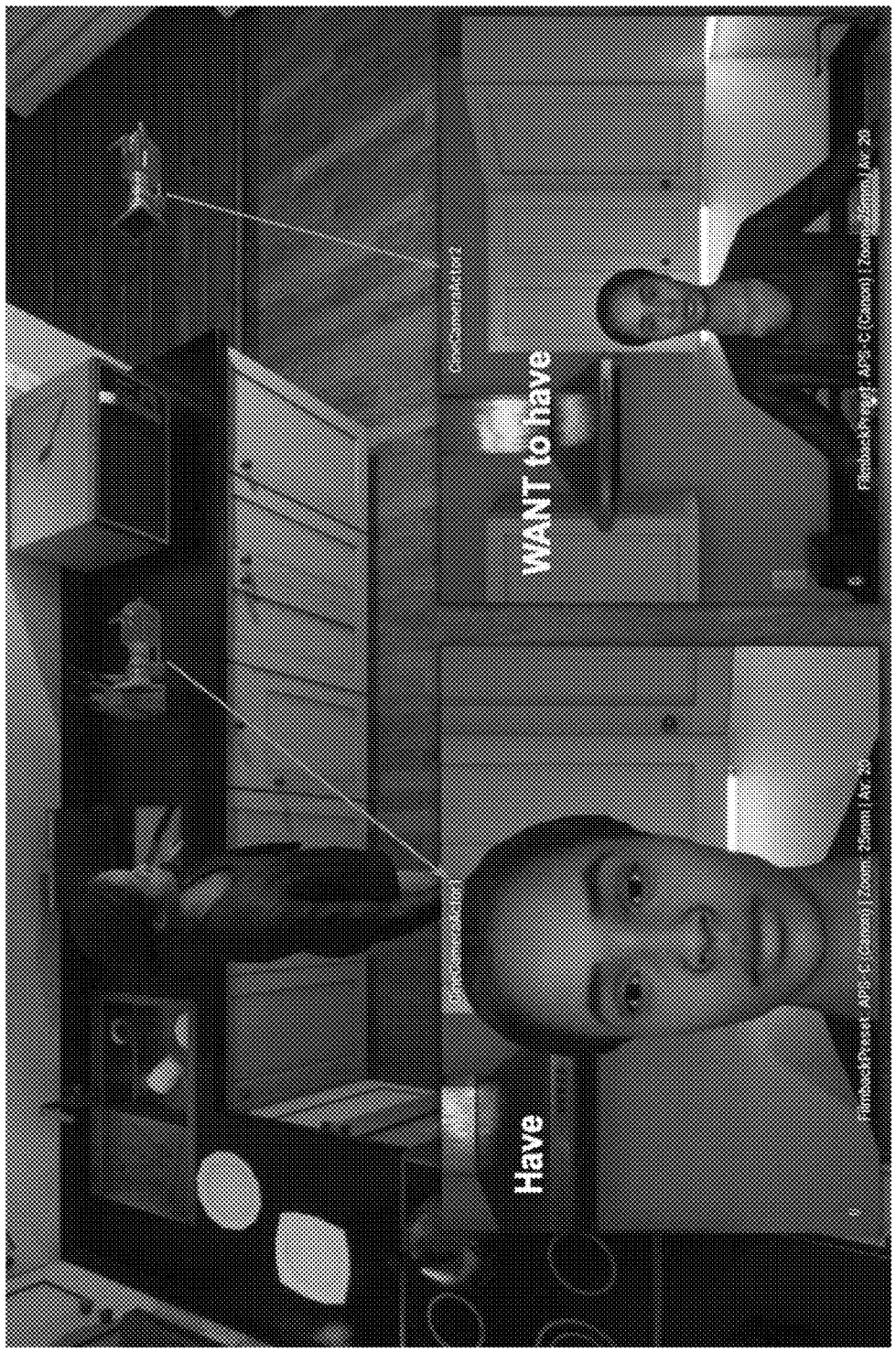
FIG. 12 illustrates an aspect of the subject matter in accordance with one example embodiment.

FIG. 12 illustrates an aspect of the subject matter in accordance with one example embodiment.

Figure 13:
FIG. 13 illustrates an aspect of the subject matter in accordance with one example embodiment.

FIG. 13 illustrates an aspect of the subject matter in accordance with one example embodiment.

FIG. 14 illustrates regions of a virtual selfie stick self-portrait image in accordance with one example embodiment.

Figure 15:
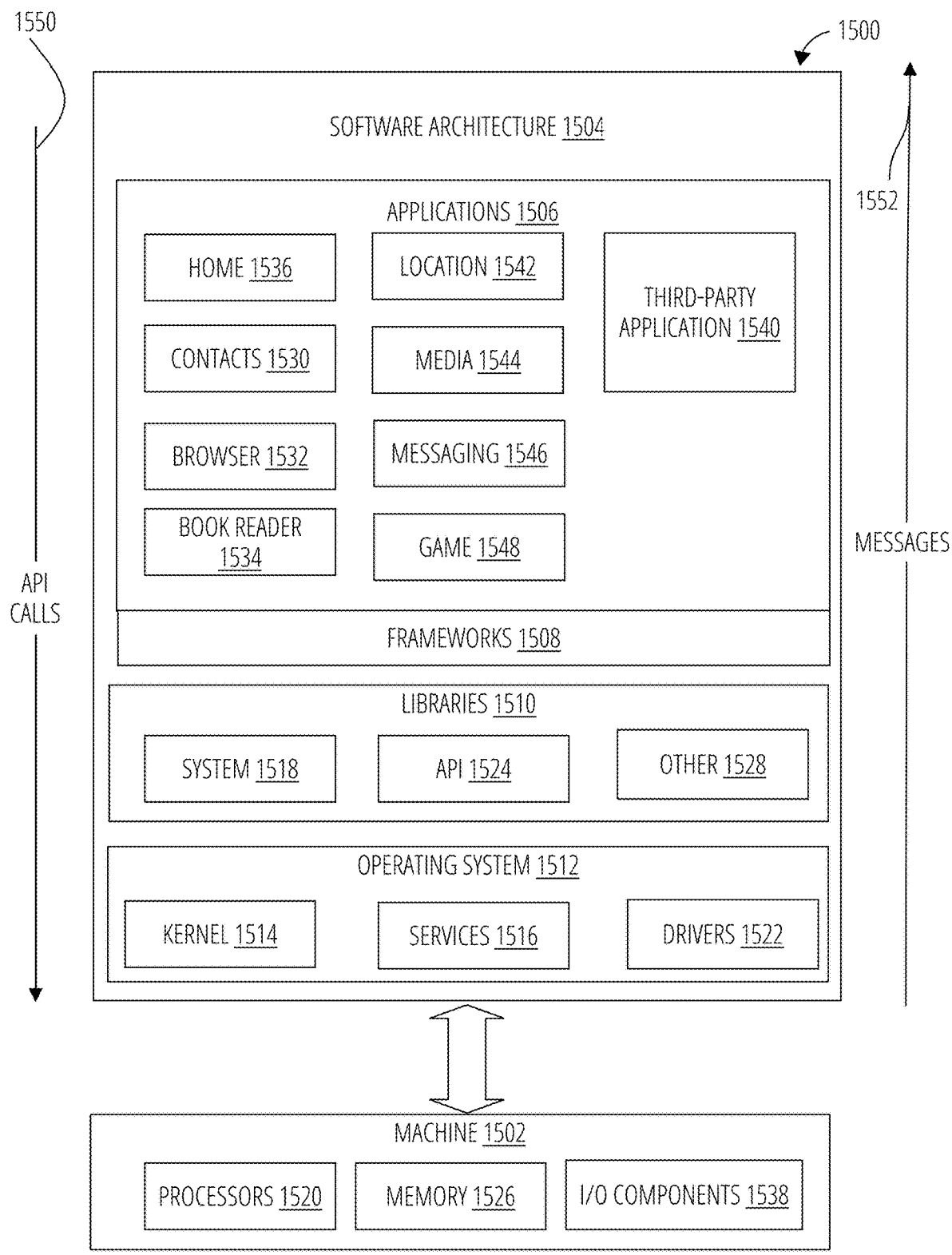
FIG. 15 is block diagram showing a software architecture within which the present disclosure may be implemented, according to an example embodiment.

FIG. 15 is a block diagram 1500 illustrating a software architecture 1504, which can be installed on any one or more of the devices described herein. The software architecture 1504 is supported by hardware such as a machine 1502 that includes Processors 1520, memory 1526, and I/O Components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), Component management, networking, and security settings, among other functionalities. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
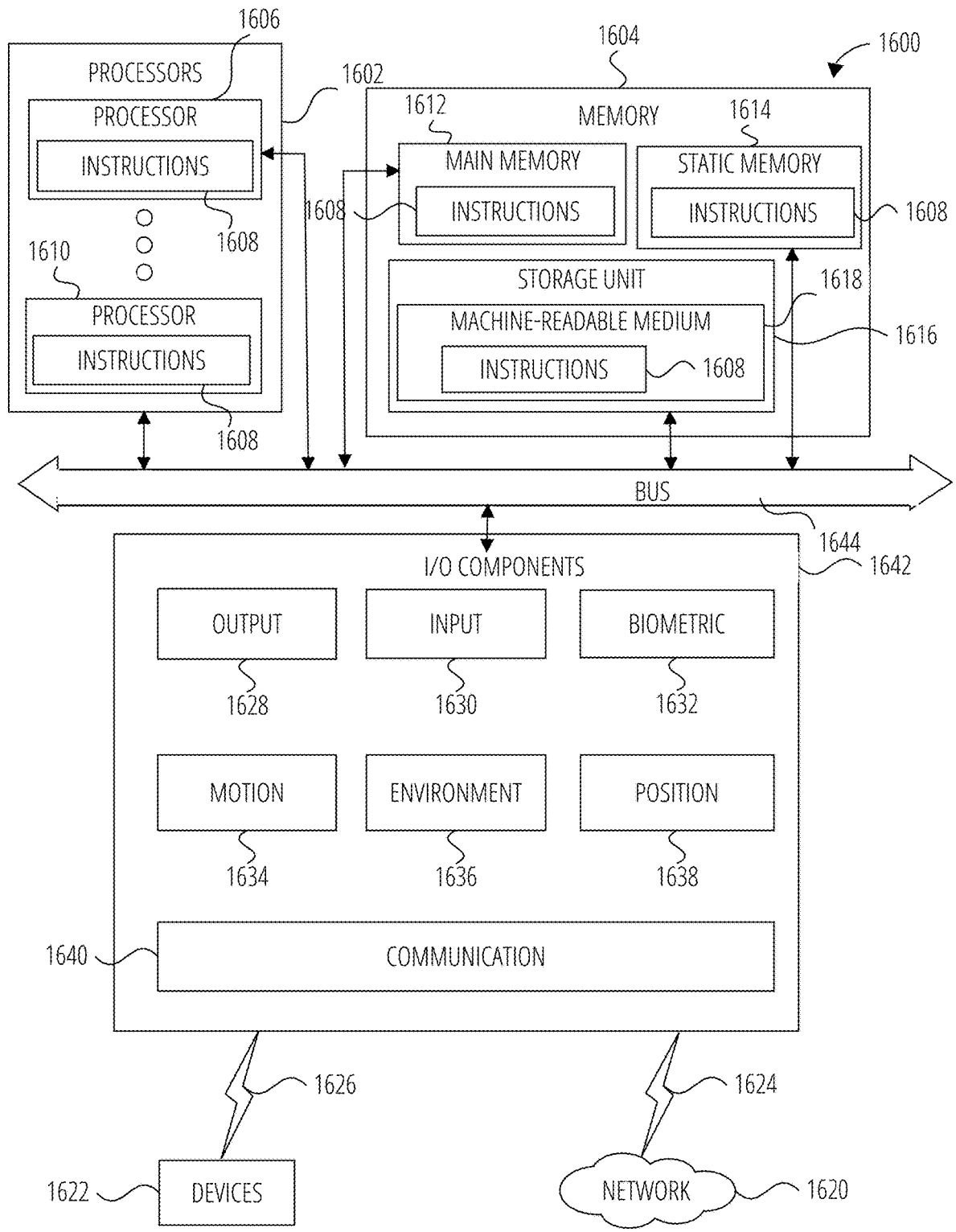
FIG. 16 is a diagrammatic representation of a machine in the form of a computer system within which a set of instructions may be executed for causing the machine to perform any one or more of the methodologies discussed herein, according to one example embodiment.

FIG. 16 is a diagrammatic representation of the machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include Processors 1602, memory 1604, and I/O Components 1642, which may be configured to communicate with each other via a bus 1644. In an example embodiment, the Processors 1602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1606 and a Processor 1610 that execute the instructions 1608. The term "Processor" is intended to include multi-core Processors that may comprise two or more independent Processors (sometimes referred to as "cores") that may execute instructions contemporaneously. Although FIG. 16 shows multiple Processors 1602, the machine 1600 may include a single Processor with a single core, a single Processor with multiple cores (e.g., a multi-core Processor), multiple Processors with a single core, multiple Processors with multiples cores, or any combination thereof.

The memory 1604 includes a main memory 1612, a static memory 1614, and a storage unit 1616, both accessible to the Processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the Processors 1602 (e.g., within the Processor's cache memory), or any suitable combination thereof, during execution thereof by the machine 1600.

The I/O Components 1642 may include a wide variety of Components to receive input, provide output, produce output, transmit information, exchange information, capture measurements, and so on. The specific I/O Components 1642 that are included in a particular machine will depend on the type of machine. For example, portable machines such as mobile phones may include a touch input device or other such input mechanisms, while a headless server machine will likely not include such a touch input device. It will be appreciated that the I/O Components 1642 may include many other Components that are not shown in FIG. 16. In various example embodiments, the I/O Components 1642 may include output Components 1628 and input Components 1630. The output Components 1628 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1630 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1642 may include biometric Components 1632, motion Components 1634, environmental Components 1636, or position Components 1638, among a wide array of other Components. For example, the biometric Components 1632 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1634 include acceleration sensor Components (e.g., accelerometer), gravitation sensor Components, rotation sensor Components (e.g., gyroscope), and so forth. The environmental Components 1636 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1638 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1642 further include communication Components 1640 operable to couple the machine 1600 to a network 1620 or devices 1622 via a coupling 1624 and a coupling 1626, respectively. For example, the communication Components 1640 may include a network interface Component or another suitable device to interface with the network 1620. In further examples, the communication Components 1640 may include wired communication Components, wireless communication Components, cellular communication Components, Near Field Communication (NFC) Components, Bluetooth ° Components (e.g., Bluetooth® Low Energy), WiFi® Components, and other communication Components to provide communication via other modalities. The devices 1622 may be another machine or any of a wide variety of peripheral devices (e.g., a peripheral device coupled via a USB).

Moreover, the communication Components 1640 may detect identifiers or include Components operable to detect identifiers. For example, the communication Components 1640 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the Processors 1602) and/or storage unit 1616 may store one or more sets of instructions and data structures (e.g., software) embodying or used by any one or more of the methodologies or functions described herein. These instructions (e.g., the instructions 1608), when executed by Processors 1602, cause various operations to implement the disclosed embodiments.

The instructions 1608 may be transmitted or received over the network 1620, using a transmission medium, via a network interface device (e.g., a network interface Component included in the communication Components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method comprising: generating, at a device, an original self-portrait image with an optical sensor of the device, the optical sensor directed at a face of a user of the device, the device being held at an arm length from the face of the user; displaying, on a display of the device, an instruction guiding the user to move the device at the arm length about the face of the user within a limited range at a plurality of poses; accessing, at the device, image data generated by the optical sensor at the plurality of poses; and generating a virtual selfie stick self-portrait image based on the original self-portrait image and the image data.

Example 2 includes the method of example 1, further comprising: identifying an expanded area, a blocked area, and an interpolation area of the virtual selfie stick self-portrait image, wherein the expanded area includes a border region of the virtual selfie stick self-portrait image, the border region including content that contiguously expand from a perimeter region of the original self-portrait image, wherein the blocked area includes a blocked region adjacent to the face of the user in the virtual selfie stick self-portrait image, the blocked region including background content that is blocked by the face of the user in the original self-portrait image, and wherein the interpolation area includes a remapping region that includes the face of the user and background content displayed in both the original self-portrait image and the virtual selfie stick self-portrait image, the remapping region excluding the border region and the blocked region.

Example 3 includes the method of example 2, further comprising: computing pixels in the expanded area and the blocked area by applying a computer vision algorithm to the original self-portrait image and the image data corresponding to the expanded area and the blocked area.

Example 4 includes the method of example 3, further comprising: running the computer vision algorithm at a first resolution based on the plurality of poses of the device; identifying a first foreground depth and a first background depth of the original self-portrait image based on running the computer vision algorithm at the first resolution; identifying a second foreground depth and a second background depth of the virtual selfie stick self-portrait image; and running the computer vision algorithm at a second resolution to compute the pixels in the expanded area and the blocked area based on the second foreground depth and the second background depth, wherein the second resolution is higher than the first resolution, wherein the second foreground depth is higher than the first foreground depth, and wherein the second background depth is higher than the first background depth.

Example 5 includes the method of example 4, further comprising: receiving a request to change the second foreground depth to a third foreground depth; computing a third background depth based on the third foreground depth; and running the computer vision algorithm at the second resolution to compute the pixels in the expanded area and the blocked area based on the third foreground depth and the third background depth.

Example 6 includes the method of example 5, further comprising: generating a slider graphical user interface element that enables the user to request changes to the second foreground depth.

Example 7 includes the method of example 3, wherein the computer vision algorithm includes at least one of a neural radiance fields algorithm, a Multi-View Stereopsis algorithm, and a three-dimensional reconstruction algorithm.

Example 8 includes the method of example 2, further comprising: remapping content in the remapping region of the original self-portrait image to the interpolation area of the virtual selfie stick self-portrait image.

Example 9 includes the method of example 1, further comprising: accessing pose data corresponding to the image data at the plurality of poses, wherein the device comprises a visual tracking system that generates the pose data based on a corresponding pose of the device, and wherein the virtual selfie stick self-portrait image is based on the pose data.

Example 10 includes the method of example 1, wherein the instruction comprising a graphical user interface that indicates a direction for the user to move the device.

Example 11 is a computing apparatus comprising: a processor; and a memory storing instructions that, when executed by the processor, configure the apparatus to perform operations comprising: generate, at a device, an original self-portrait image with an optical sensor of the device, the optical sensor directed at a face of a user of the device, the device being held at an arm length from the face of the user; display, on a display of the device, an instruction guiding the user to move the device at the arm length about the face of the user within a limited range at a plurality of poses; access, at the device, image data generated by the optical sensor at the plurality of poses; and generate a virtual selfie stick self-portrait image based on the original self-portrait image and the image data.

Example 12 includes the computing apparatus of example 11, wherein the instructions further configure the apparatus to: identify an expanded area, a blocked area, and an interpolation area of the virtual selfie stick self-portrait image, wherein the expanded area includes a border region of the virtual selfie stick self-portrait image, the border region include content that contiguously expand from a perimeter region of the original self-portrait image, wherein the blocked area includes a blocked region adjacent to the face of the user in the virtual selfie stick self-portrait image, the blocked region including background content that is blocked by the face of the user in the original self-portrait image, and wherein the interpolation area includes a remapping region that includes the face of the user and background content displayed in both the original self-portrait image and the virtual selfie stick self-portrait image, the remapping region exclude the border region and the blocked region.

Example 13 includes the computing apparatus of example 12, wherein the instructions further configure the apparatus to: compute pixels in the expanded area and the blocked area by applying a computer vision algorithm to the original self-portrait image and the image data corresponding to the expanded area and the blocked area.

Example 14 includes the computing apparatus of example 13, wherein the instructions further configure the apparatus to: run the computer vision algorithm at a first resolution based on the plurality of poses of the device; identify a first foreground depth and a first background depth of the original self-portrait image based on running the computer vision algorithm at the first resolution; identify a second foreground depth and a second background depth of the virtual selfie stick self-portrait image; and run the computer vision algorithm at a second resolution to compute the pixels in the expanded area and the blocked area based on the second foreground depth and the second background depth, wherein the second resolution is higher than the first resolution, wherein the second foreground depth is higher than the first foreground depth, and wherein the second background depth is higher than the first background depth.

Example 15 includes the computing apparatus of example 14, wherein the instructions further configure the apparatus to: receive a request to change the second foreground depth to a third foreground depth; compute a third background depth based on the third foreground depth; and run the computer vision algorithm at the second resolution to compute the pixels in the expanded area and the blocked area based on the third foreground depth and the third background depth.

Example 16 includes the computing apparatus of example 15, wherein the instructions further configure the apparatus to: generate a slider graphical user interface element that enables the user to request changes to the second foreground depth.

Example 17 includes the computing apparatus of example 13, wherein the computer vision algorithm includes at least one of a neural radiance fields algorithm, a Multi-View Stereopsis algorithm, and a three-dimensional reconstruction algorithm.

Example 18 includes the computing apparatus of example 12, wherein the instructions further configure the apparatus to: remap content in the remapping region of the original self-portrait image to the interpolation area of the virtual selfie stick self-portrait image.

Example 19 includes the computing apparatus of example 11, wherein the instructions further configure the apparatus to: access pose data corresponding to the image data at the plurality of poses, wherein the device comprises a visual tracking system that generates the pose data based on a corresponding pose of the device, and wherein the virtual selfie stick self-portrait image is based on the pose data.

Example 20 is a non-transitory computer-readable storage medium, the computer-readable storage medium including instructions that when executed by a computer, cause the computer to perform operations comprising: generate, at a device, an original self-portrait image with an optical sensor of the device, the optical sensor directed at a face of a user of the device, the device being held at an arm length from the face of the user; display, on a display of the device, an instruction guiding the user to move the device at the arm length about the face of the user within a limited range at a plurality of poses; access, at the device, image data generated by the optical sensor at the plurality of poses; and generate a virtual selfie stick self-portrait image based on the original self-portrait image and the image data.

What is claimed is:

1. A method comprising:
generating, at a device, an original self-portrait image with an optical sensor of the device, the optical sensor directed at a face of a user of the device, the device being held at an arm length from the face of the user;
displaying, on a display of the device, a directional graphical user interface that includes an arrow that points to a direction guiding the user to move the device at the arm length about the face of the user within a limited range at a plurality of poses;
displaying, on the display of the device, a slider graphical user interface that enables the user to adjust a distance of a virtual selfie stick relative to the face of the user;
accessing, at the device, image data generated by the optical sensor at the plurality of poses;
generating a virtual selfie stick self-portrait image based on the distance of the virtual selfie stick, the original self-portrait image, and the image data;
partitioning the virtual selfie stick self-portrait image into an expanded area, a blocked area, and an interpolation area;
calculating pixels in the expanded area and the blocked area using a computer vision algorithm;
calculating pixels in the interpolation area using a scaling engine; and
in response to partitioning the virtual selfie stick self-portrait image into the expanded area, the blocked area, and the interpolation area, applying the computer vision algorithm only to the expanded area and the blocked area, and applying the scaling engine only to the interpolation area.

2. The method of claim 1,
wherein the expanded area includes a border region of the virtual selfie stick self-portrait image, the border region including content that contiguously expands from a perimeter region of the original self-portrait image,
wherein the blocked area includes a blocked region adjacent to the face of the user in the virtual selfie stick self-portrait image, the blocked region including background content that is blocked by the face of the user in the original self-portrait image, and
wherein the interpolation area includes a remapping region that includes the face of the user and background content displayed in both the original self-portrait image and the virtual selfie stick self-portrait image, the remapping region excluding the border region and the blocked region.

3. The method of claim 2, further comprising:
computing pixels in the expanded area and the blocked area by applying the computer vision algorithm to the original self-portrait image and the image data corresponding to the expanded area and the blocked area.

4. The method of claim 3, further comprising:
running the computer vision algorithm at a first resolution based on the plurality of poses of the device;
identifying a first foreground depth and a first background depth of the original self-portrait image based on running the computer vision algorithm at the first resolution;
identifying a second foreground depth and a second background depth of the virtual selfie stick self-portrait image; and
running the computer vision algorithm at a second resolution to compute the pixels in the expanded area and the blocked area based on the second foreground depth and the second background depth,
wherein the second resolution is higher than the first resolution,
wherein the second foreground depth is higher than the first foreground depth, and
wherein the second background depth is higher than the first background depth.

5. The method of claim 4, further comprising:
receiving a request to change the second foreground depth to a third foreground depth;
computing a third background depth based on the third foreground depth; and
running the computer vision algorithm at the second resolution to compute the pixels in the expanded area and the blocked area based on the third foreground depth and the third background depth.

6. The method of claim 3, wherein the computer vision algorithm includes at least one of a neural radiance fields algorithm, a Multi-View Stereopsis algorithm, and a three-dimensional reconstruction algorithm.

7. The method of claim 1, further comprising:
adjusting a depth of a background in the virtual selfie stick self-portrait image based on the distance selected in the slider graphical user interface.

8. The method of claim 1, further comprising:
accessing pose data corresponding to the image data at the plurality of poses,
wherein the device comprises a visual tracking system that generates the pose data based on a corresponding pose of the device, and
wherein the virtual selfie stick self-portrait image is based on the pose data.

9. The method of claim 1, wherein the directional graphical user interface comprises text instructions that instruct the user to move the device in the direction of the arrow.

10. A computing apparatus comprising:
a display;
an optical sensor;
a processor; and
a memory storing instructions that, when executed by the processor, configure the computing apparatus to perform operations comprising:
generate an original self-portrait image with the optical sensor, the optical sensor directed at a face of a user of the computing apparatus, the computing apparatus being held at an arm length from the face of the user;
display, on the display, a directional graphical user interface that includes an arrow that points to a direction guiding the user to move the computing apparatus at the arm length about the face of the user within a limited range at a plurality of poses;
display, on the display, a slider graphical user interface that enables the user to adjust a distance of a virtual selfie stick relative to the face of the user;
access, at the computing apparatus, image data generated by the optical sensor at the plurality of poses;
generating a virtual selfie stick self-portrait image based on the distance of the virtual selfie stick, the original self-portrait image, and the image data;
partitioning the virtual selfie stick self-portrait image into an expanded area, a blocked area, and an interpolation area;
calculating pixels in the expanded area and the blocked area using a computer vision algorithm;

calculating pixels in the interpolation area using a scaling engine; and in response to partitioning the virtual selfie stick self-portrait image into the expanded area, the blocked area, and the interpolation area, applying the computer vision algorithm only to the expanded area and the blocked area, and applying the scaling engine only to the interpolation area.

11. The computing apparatus of claim 10, wherein the expanded area includes a border region of the virtual selfie stick self-portrait image, the border region includes content that contiguously expands from a perimeter region of the original self-portrait image, wherein the blocked area includes a blocked region adjacent to the face of the user in the virtual selfie stick self-portrait image, the blocked region including background content that is blocked by the face of the user in the original self-portrait image, and wherein the interpolation area includes a remapping region that includes the face of the user and background content displayed in both the original self-portrait image and the virtual selfie stick self-portrait image, the remapping region excluding the border region and the blocked region.

12. The computing apparatus of claim 11, wherein the instructions further configure the computing apparatus to:

compute pixels in the expanded area and the blocked area by applying the computer vision algorithm to the original self-portrait image and the image data corresponding to the expanded area and the blocked area.

13. The computing apparatus of claim 12, wherein the instructions further configure the computing apparatus to:

run the computer vision algorithm at a first resolution based on the plurality of poses of the computing apparatus;

identify a first foreground depth and a first background depth of the original self-portrait image based on running the computer vision algorithm at the first resolution;

identify a second foreground depth and a second background depth of the virtual selfie stick self-portrait image; and run the computer vision algorithm at a second resolution to compute the pixels in the expanded area and the blocked area based on the second foreground depth and the second background depth, wherein the second resolution is higher than the first resolution, wherein the second foreground depth is higher than the first foreground depth, and wherein the second background depth is higher than the first background depth.

14. The computing apparatus of claim 13, wherein the instructions further configure the computing apparatus to:

receive a request to change the second foreground depth to a third foreground depth;

compute a third background depth based on the third foreground depth; and run the computer vision algorithm at the second resolution to compute the pixels in the expanded area and the blocked area based on the third foreground depth and the third background depth.

15. The computing apparatus of claim 12, wherein the computer vision algorithm includes at least one of a neural radiance fields algorithm, a Multi-View Stereopsis algorithm, and a three-dimensional reconstruction algorithm.

16. The computing apparatus of claim 10, wherein the instructions further configure the computing apparatus to:

adjust a depth of a background in the virtual selfie stick self-portrait image based on the distance selected in the slider graphical user interface.

17. The computing apparatus of claim 10, wherein the instructions further configure the computing apparatus to:

access pose data corresponding to the image data at the plurality of poses, wherein the computing apparatus comprises a visual tracking system that generates the pose data based on a corresponding pose of the computing apparatus, and wherein the virtual selfie stick self-portrait image is based on the pose data.

18. A non-transitory computer-readable storage medium, the non-transitory computer-readable storage medium including instructions that when executed by a device, cause the device to perform operations comprising:

generate, at the device, an original self-portrait image with an optical sensor of the device, the optical sensor directed at a face of a user of the device, the device being held at an arm length from the face of the user;

display, on a display of the device, a directional graphical user interface that includes an arrow that points to a direction guiding the user to move the device at the arm length about the face of the user within a limited range at a plurality of poses;

display, on the display of the device, a slider graphical user interface that enables the user to adjust a distance of a virtual selfie stick relative to the face of the user;

access, at the device, image data generated by the optical sensor at the plurality of poses;

generate a virtual selfie stick self-portrait image based on the distance of the virtual selfie stick, the original self-portrait image, and the image data;

partition the virtual selfie stick self-portrait image into an expanded area, a blocked area, and an interpolation area;

calculate pixels in the expanded area and the blocked area using a computer vision algorithm;

calculate pixels in the interpolation area using a scaling engine; and in response to partitioning the virtual selfie stick self-portrait image into the expanded area, the blocked area, and the interpolation area, apply the computer vision algorithm only to the expanded area and the blocked area, and apply the scaling engine only to the interpolation area.

* * * * *